(12) United States Patent
Zhang et al.

(10) Patent No.: US 11,644,902 B2
(45) Date of Patent: May 9, 2023

(54) GESTURE-BASED CONTENT TRANSFER

(71) Applicant: GOOGLE LLC, Mountain View, CA (US)

(72) Inventors: Ian Chen Zhang, Mercer Island, WA (US); Ricardo John Campbell, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/247,106

(22) Filed: Nov. 30, 2020

(65) Prior Publication Data

US 2022/0171466 A1    Jun. 2, 2022

(51) Int. Cl.
*G06F 3/01* (2006.01)
*G06F 3/14* (2006.01)

(52) U.S. Cl.
CPC .............. *G06F 3/017* (2013.01); *G06F 3/012* (2013.01); *G06F 3/1423* (2013.01)

(58) Field of Classification Search
CPC ........ G06F 3/017; G06F 3/1423; G06F 3/012; G06F 3/013; G06F 3/147; G09G 2354/00
See application file for complete search history.

(56) References Cited

U.S. PATENT DOCUMENTS

| | | | |
|---|---|---|---|
| 8,558,759 B1 | 10/2013 | Wheeler et al. | |
| 9,223,402 B2 * | 12/2015 | Cho | G06F 3/016 |
| 9,759,917 B2 * | 9/2017 | Osterhout | G06F 3/011 |
| 9,948,729 B1 * | 4/2018 | Ekambaram | H04L 67/148 |
| 10,539,787 B2 * | 1/2020 | Haddick | G06F 3/0428 |
| 10,860,100 B2 * | 12/2020 | Osterhout | G06F 3/017 |
| 2011/0029918 A1 * | 2/2011 | Yoo | G06F 3/013 |
| | | | 345/473 |
| 2012/0139907 A1 * | 6/2012 | Lee | G06F 3/0304 |
| | | | 345/419 |
| 2012/0272179 A1 * | 10/2012 | Stafford | G06F 3/012 |
| | | | 345/157 |
| 2012/0302289 A1 * | 11/2012 | Kang | G06F 3/017 |
| | | | 455/557 |
| 2012/0326968 A1 * | 12/2012 | Kakuda | A61K 35/76 |
| | | | 345/156 |
| 2013/0083025 A1 * | 4/2013 | Gibson | G06F 3/1438 |
| | | | 345/428 |
| 2013/0147686 A1 * | 6/2013 | Clavin | G02B 27/017 |
| | | | 345/8 |
| 2014/0062854 A1 * | 3/2014 | Cho | G06F 3/016 |
| | | | 345/156 |

(Continued)

OTHER PUBLICATIONS

"Hand Heart", Wikipedia; https://en.wikipedia.org/wiki/Hand_heart, May 21, 2020, 1 page.

(Continued)

*Primary Examiner* — Grant Sitta
(74) *Attorney, Agent, or Firm* — Brake Hughes Bellermann LLP

(57) ABSTRACT

A method can include determining, by a head-mounted device, that a user is looking at a first electronic device; determining that the user made a predefined gesture; determining content that was presented by the first electronic device when the user made the predefined gesture; and instructing a second electronic to present the content that was presented by the first electronic device when the user made the predefined gesture.

21 Claims, 16 Drawing Sheets

(56) References Cited

U.S. PATENT DOCUMENTS

| | | | |
|---|---|---|---|
| 2014/0149859 A1* | 5/2014 | Van Dyken | H04W 4/21 |
| | | | 715/702 |
| 2014/0361988 A1* | 12/2014 | Katz | G02B 27/0172 |
| | | | 345/156 |
| 2015/0346836 A1* | 12/2015 | Schlittenbauer | G06F 3/017 |
| | | | 345/156 |
| 2016/0124506 A1* | 5/2016 | Hwang | G06F 3/017 |
| | | | 345/156 |
| 2016/0202943 A1* | 7/2016 | Choi | G06F 3/04842 |
| | | | 715/753 |
| 2019/0132732 A1* | 5/2019 | Bharti | G06F 3/04883 |
| 2019/0179423 A1* | 6/2019 | Rose | G02B 27/0093 |
| 2019/0182355 A1 | 6/2019 | Clement et al. | |
| 2019/0266801 A1* | 8/2019 | Nicholson | G06F 9/543 |
| 2020/0005026 A1 | 1/2020 | Andersen et al. | |
| 2020/0070051 A1 | 3/2020 | Frappiea | |
| 2020/0105226 A1* | 4/2020 | Greenebaum | G09G 5/10 |

OTHER PUBLICATIONS

Mihalcik, Carrie , "Apple Glass: Major leak may spill details on long-rumored AR glasses", CNET;, May 19, 2020, 6 pages.

\* cited by examiner

US 11,644,902 B2

GESTURE-BASED CONTENT TRANSFER

TECHNICAL FIELD

This description relates to controlling content on electronic devices.

BACKGROUND

Users can have multiple electronic devices capable of presenting content. A user may desire for content presented by a first electronic device to be presented by a second electronic device.

SUMMARY

According to an example, a method can include determining, by a head-mounted device, that a user is looking at a first electronic device; determining that the user made a predefined gesture; determining content that was presented by the first electronic device when the user made the predefined gesture; and instructing a second electronic to present the content that was presented by the first electronic device when the user made the predefined gesture.

According to an example, a non-transitory computer-readable storage medium can include instructions stored thereon. When executed by at least one processor, the instructions can be configured to cause a head-mounted device to determine that a user is looking at a first electronic device, determine that the user made a predefined gesture, determine content that was presented by the first electronic device when the user made the predefined gesture, and instruct a second electronic to present the content that was presented by the first electronic device when the user made the predefined gesture.

According to an example, a head-mounted device can include at least one processor, and anon-transitory computer-readable storage medium comprising instructions stored thereon. When executed by at least one processor, the instructions can be configured to cause the head-mounted device to, determine that a user is looking at a first electronic device, determine that the user made a predefined gesture, determine content that was presented by the first electronic device when the user made the predefined gesture, and instruct a second electronic to present the content that was presented by the first electronic device when the user made the predefined gesture.

The details of one or more implementations are set forth in the accompanying drawings and the description below. Other features will be apparent from the description and drawings, and from the claims.

BRIEF DESCRIPTION OF THE DRAWINGS

Like reference numbers refer to like elements.

DETAILED DESCRIPTION

A head-mounted device can facilitate transferring content, such as a video, from a first electronic device to a second electronic device. The user can find content on the first electronic device, which is easy to navigate and/or provide input into, but has a small screen or display, and the head-mounted device can transfer the content to the second electronic device, which has a larger screen and/or display. The head-mounted device can determine which device, that the user was looking at, which will be considered the first electronic device. The head-mounted device can determine that the user made a predefined gesture after looking at the first electronic device. The head-mounted device can determine content, such as video content, that the first electronic device was presenting when the user made the predefined gesture. The head-mounted device can instruct a second electronic device to present the content. The second electronic device can respond to receiving the instruction from the head-mounted device by presenting the content. The head-mounted device can enable the user to easily transfer content from the first electronic device to the second electronic device by performing the predefined gesture.

Figure 1:
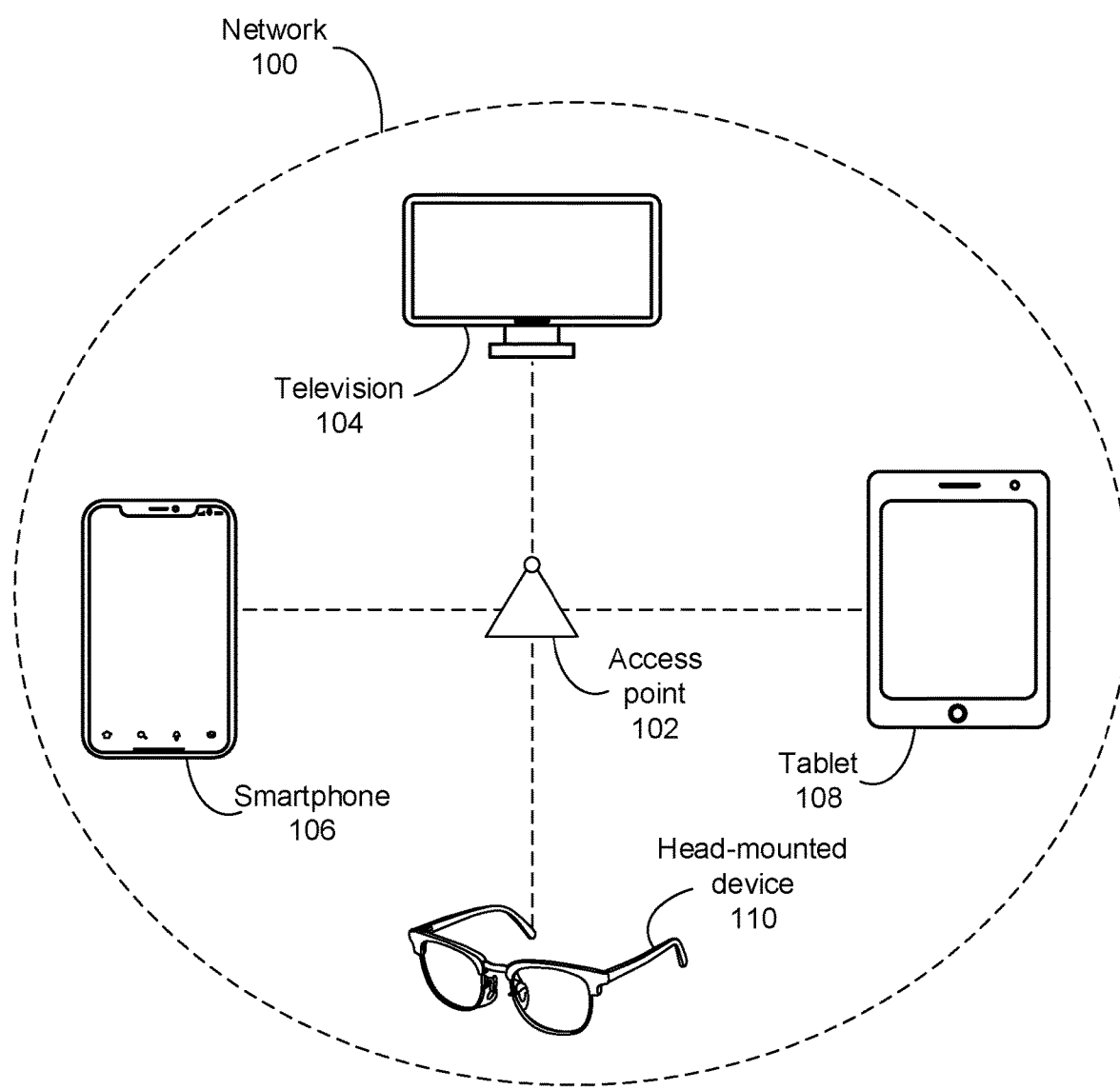
FIG. 1 is a network diagram showing devices that can implement the techniques described herein.

FIG. 1 is a network diagram showing devices that can implement the techniques described herein. In this example, the devices are included in a wireless network 100. In some examples, the wireless network 100 can be served by an access point 102, such as an Institute for Electrical and Electronics Engineers (IEEE) 802.11 Wireless Fidelity (WiFi) access point that serves a wireless local area network (WLAN). The access point 102 can communicate with the other devices in the wireless network 100, and can relay messages and/or instructions between devices in the wireless network 100. In some examples, the devices can form a peer-to-peer network, communicating with each other directly.

The wireless network 100 can include electronic devices that present and/or play content, such as media content. The content can include, for example, video content. The devices that present and/or display content can include, for example, a television 104, a smartphone 106, and/or a tablet 108.

Figure 5A:
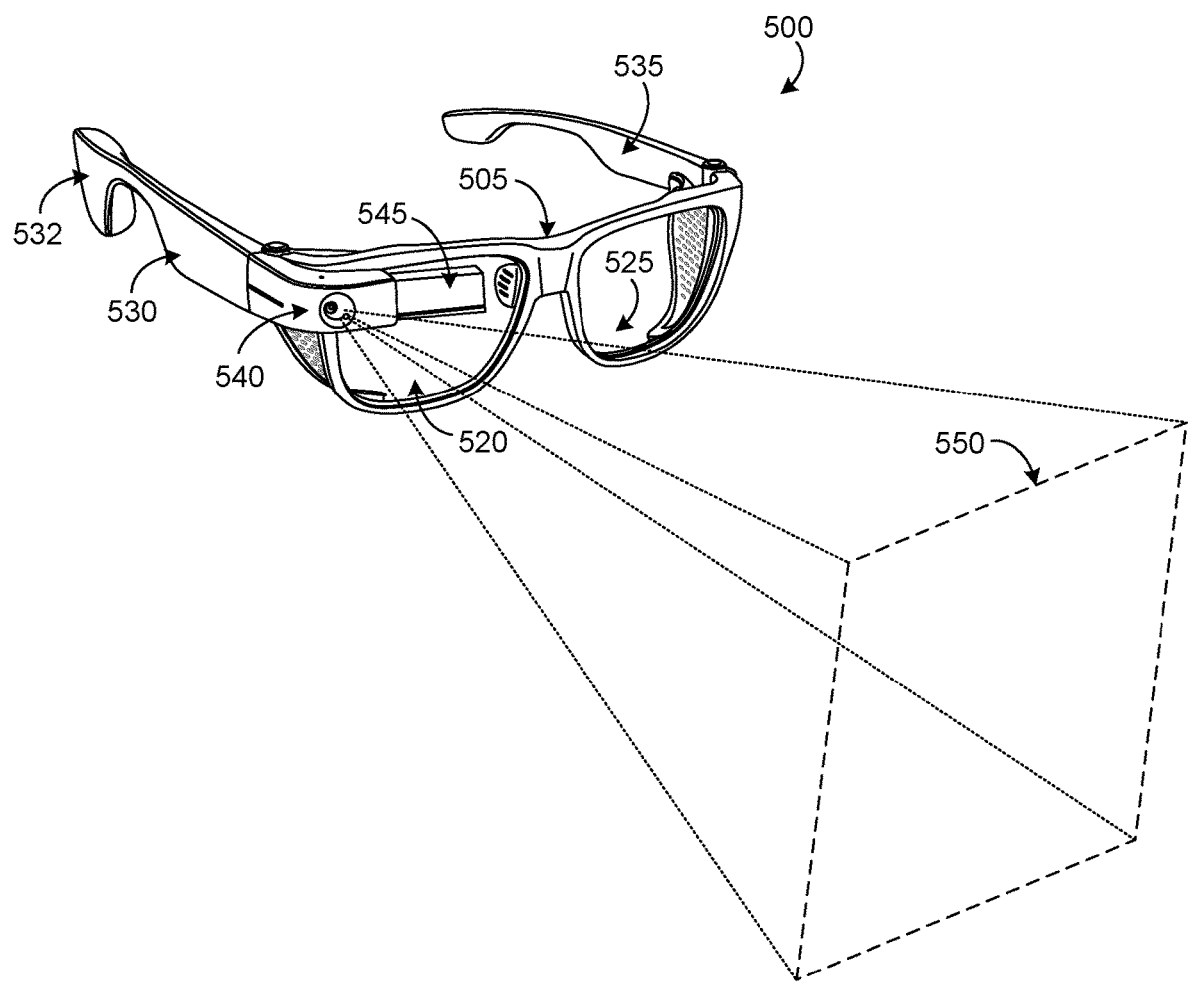
FIG. 5A is a front perspective view of an implementation of the head-mounted device as augmented-reality glasses.
Figure 5B:
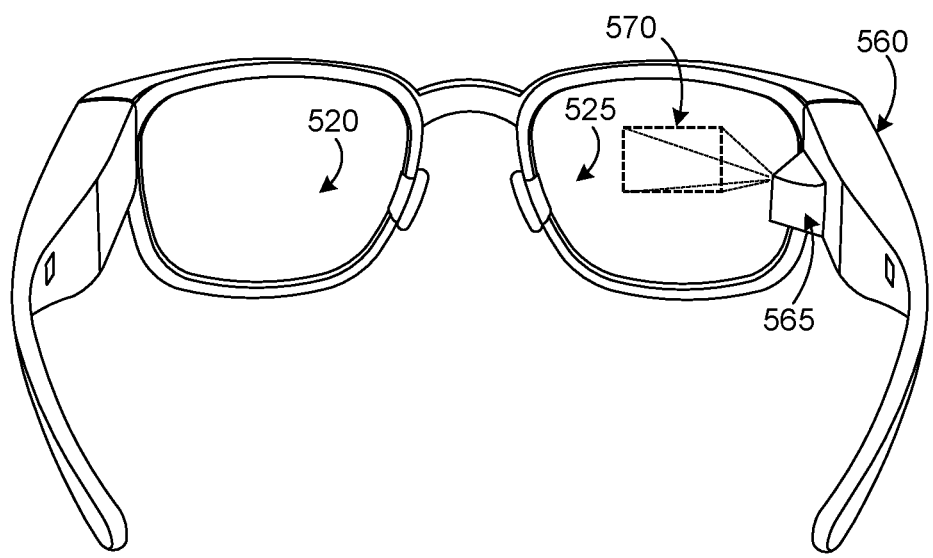
FIG. 5B is a rear perspective view of an implementation of the head-mounted device as augmented-reality glasses.
Figure 6:
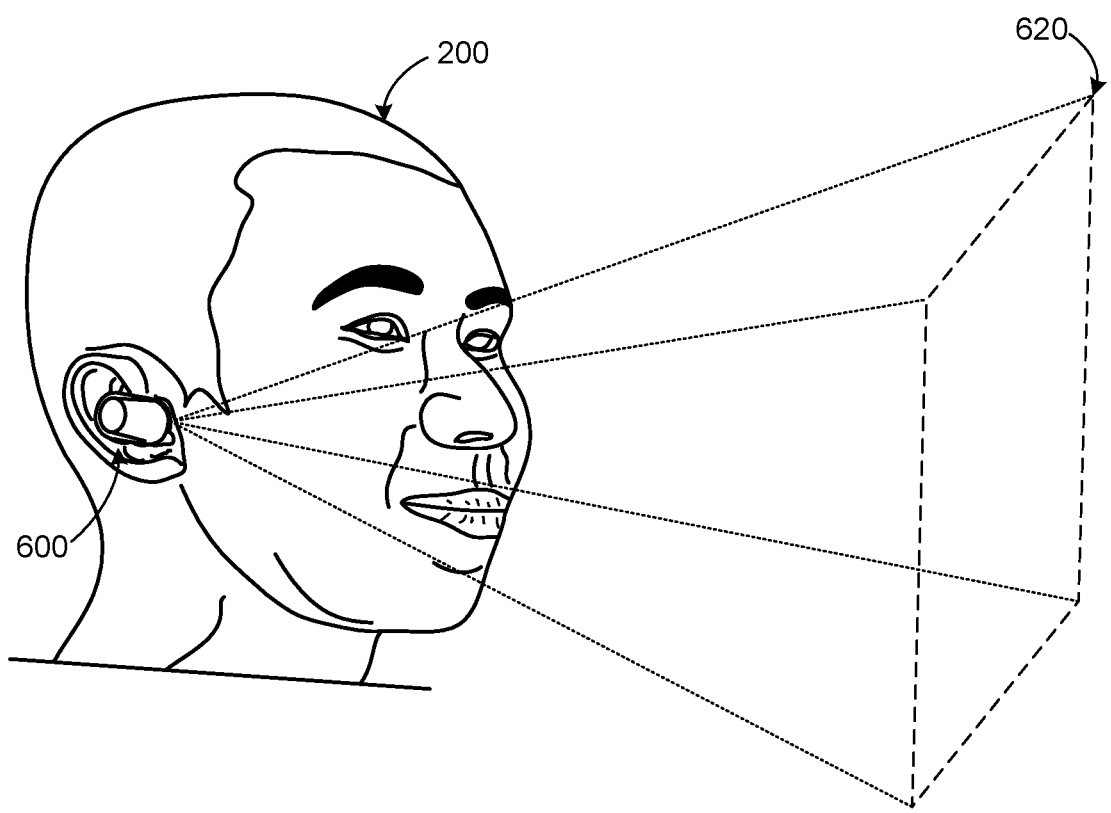
FIG. 6 is a perspective view of another implementation of the head-mounted device.

The wireless network 100 can include a head-mounted device 110. The head-mounted device 110 can include a head-mounted computing device, such as augmented-reality glasses (an example of which is shown in FIGS. 5A and 5B)

or an augmented-reality earbud (an example of which is shown in FIG. 6), as non-limiting examples. The head-mounted device 110 can be wirelessly coupled to the other electronic devices, which can be considered a first electronic device and a second electronic device and can include the smartphone 106, the tablet 108, and the television 104, via the access point 102, or by a peer-to-peer technique such as IEEE 801.15 (Bluetooth). The head-mounted device 110 can include a camera that captures images for recognizing devices, such as a smartphone 106 or tablet, and/or for recognizing gestures performed by a user. In some examples, the head-mounted device 110 can include a display for presenting information to the user, such as a prompt for the user to perform a gesture that prompts a response from the head-mounted device 110.

In some examples, the head-mounted device 110 can facilitate transferring content, such as a video, from a first electronic device, such as the smartphone 106 or tablet 108, to a second electronic device, such as the television 104. In some examples, the head-mounted device 110 can facilitate transferring content from the television 104 to the smartphone 106 or tablet 108. The user can find content on a first electronic device, such as the smartphone 106 or tablet 108, which is easy to navigate and/or provide input into, but has a small screen or display, and the head-mounted device 110 can transfer the content to the second electronic device, such as the television 104, which has a larger screen and/or display. The head-mounted device 110 can determine which device, such as the smartphone 106 or tablet 108, that the user was looking at, which will be considered the first electronic device. The head-mounted device 110 can determine which device that the user was looking at based on a direction that the head-mounted device 110 was pointing and a determined location of the device, and/or based on an image captured by a camera included in the head-mounted device 110. The head-mounted device 110 can determine that the user made a gesture, which may be a predefined gesture, after and/or while looking at the first electronic device. The predefined gesture can include a movement of the user's hand that does not contact the first electronic device. The predefined gesture can include, for example, a grabbing and/or throwing motion. The head-mounted device 110 can determine that the user made the predefined gesture based on images captured by the camera included in the head-mounted device 110. The head-mounted device 110 can determine content, such as video content, that the first electronic device was presenting when the user made the predefined gesture. In some examples, the head-mounted device 110 can determine the content by requesting a file and/or universal resource locator (URL) representing the content from the first electronic device, and/or a location (such as a time within a video) from the first electronic device. The head-mounted device 110 can instruct a second electronic device, such as the television 104, to present the content. The head-mounted device 110 can instruct the second electronic device by sending an instruction, including the file and/or URL and location to the second electronic device. The second electronic device can respond to receiving the instruction from the head-mounted device 110 by presenting the content.

Figure 2A:
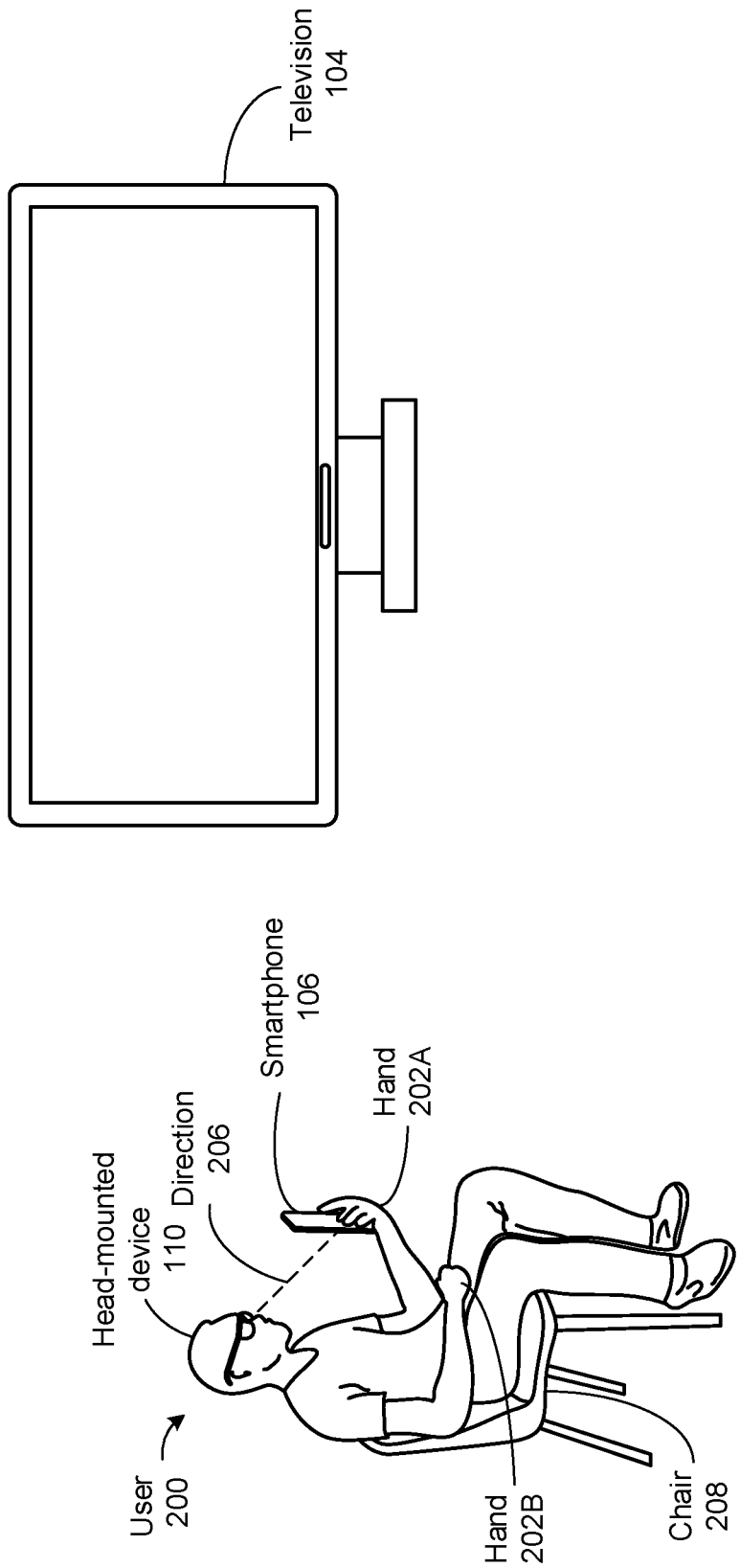
FIG. 2A is a perspective view of a user viewing a first electronic device that is presenting content.

FIG. 2A is a perspective view of a user 200 viewing a first electronic device that is presenting content 204. In this example, the first electronic device presenting content 204 is the smartphone 106 (the content 204 is labeled in FIGS. 2B, 2D, and 2F). In some examples, the content 204 can include media content retrieved by the first electronic device. In some examples, the content 204 can include content generated by the user 200 on the first electronic device, such as a presentation or design that the user 200 created and/or generated on a smartphone 106 or tablet 108. In the examples in which the user 200 generated and/or created the content 204, the user 200 can instruct the head-mounted device 110 to transfer the content 204 from the first electronic device to the second electronic device so that the user 200 can view and/or edit the content 204 on different form factors and/or different sizes of displays. In some examples, the user 200 can edit the content 204 on the first electronic device, and the first electronic device will send and/or transfer the edited content to the second electronic device, allowing the user to view the edited content on the second electronic device.

The user 200 can be wearing the head-mounted device 110 on the user's head while, for example, sitting on a chair 208. The user 200 can be in a same room as a second electronic device, which, in the example shown in FIG. 2A, is the television 104. In the example shown in FIG. 2A, the head-mounted device 110 includes augmented-reality glasses. In this example, the user 200 is holding the first electronic device (the smartphone 106) with the user's 200 left hand 202A, and interacting with and/or providing touch input into the first electronic device (the smartphone 106) with the user's right hand 202B.

The head-mounted device 110 can determine that the user 200 is looking at the smartphone 106 (which is an example of the first electronic device) and/or that the head-mounted device 110 is pointing at the smartphone 106. In some examples, the head-mounted device 110 can determine that the user 200 is looking at the smartphone 106 and/or that the head-mounted device 110 is pointing at the smartphone 106 based on a direction 206 and/or orientation of the head-mounted device 110 (which the head-mounted device 110 can determine based on an accelerometer included in the head-mounted device 110) and a determined location of the smartphone 106. The head-mounted device 110 can determine the location of the smartphone 106 based on a location transmitted by the smartphone 106 (which can be based on a global positioning system (GPS) included in the smartphone 106), based on triangulation of signals sent and received by devices included in the wireless network 100, and/or based on data collected by the camera included in the head-mounted device 110, as non-limiting examples. In some examples, the head-mounted device 110 can determine that the user 200 is looking at the smartphone 106 and/or that the head-mounted device 110 is pointing at the smartphone 106 based on an image of the smartphone 106 being captured by the camera included in the head-mounted device 110.

Figure 2B:
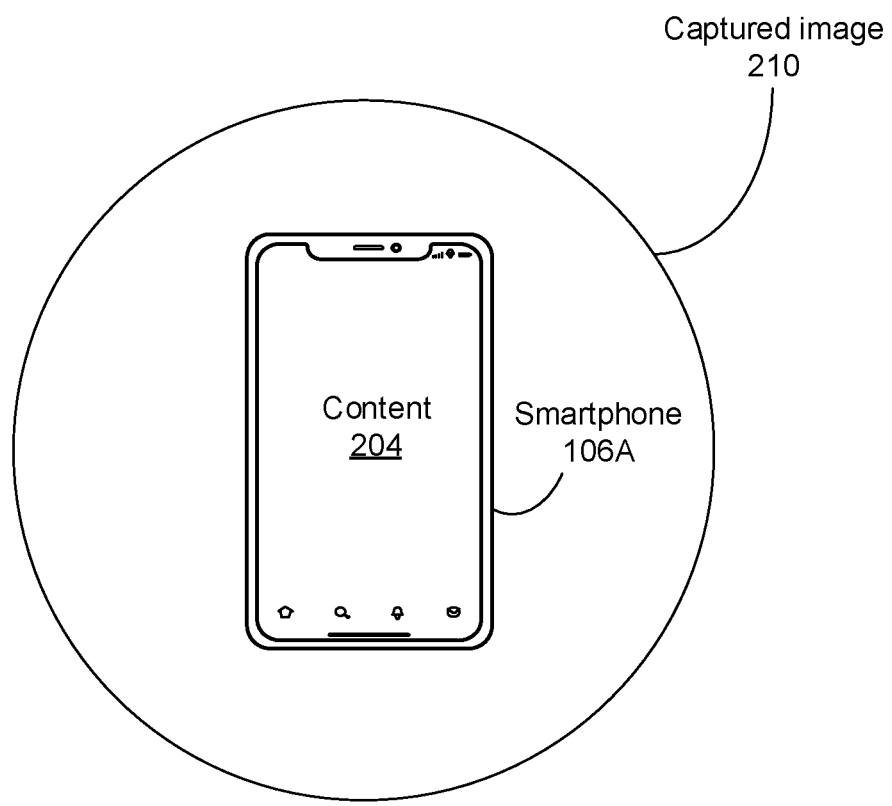
FIG. 2B shows an image of the first electronic device captured by a head-mounted device.

FIG. 2B shows an image 210 of the first electronic device captured by a head-mounted device 110. As discussed above, in this example, the first electronic device is the smartphone 106.

In the example shown in FIG. 2B, the captured image 210 includes an image of the smartphone 106A (the user's 200 hand 202A is omitted for illustrative purposes). The head-mounted device 110 can perform image recognition to determine that the image of the smartphone 106A represents the smartphone 106. The head-mounted device 110 can maintain a list of devices in the wireless network 100, which can be based on addresses such as Medium Access Control (MAC) addresses, and which can indicate the type and/or appearance of the devices. The head-mounted device 110 can compare the image of the smartphone 106A in the captured image 210 to images of devices that match the types of devices in the list maintained by the head-mounted device 110. The head-mounted device 110 can select the device from the list that appears most similar to the image of the device captured by the camera included in the head-mounted device 110. If the image of the smartphone 106A matches the characteristics of a device in the list maintained by the head-mounted device 110, then the head-mounted device 110 can determine that the user 200 is looking at, and/or that the head-mounted device 110 is pointing at the matching device, in this example the smartphone 106.

The head-mounted device 110 can store an indicator of the most recent device, such as the smartphone 106, that the user 200 was looking at and/or that the head-mounted device 110 was pointing at. The head-mounted device 110 can store the most recent device as the first electronic device so that, upon determining that the user 200 has performed the predefined gesture, the head-mounted device 110 can determine content that the most recent device was presenting.

After the head-mounted device 110 has determined and/or stored the most recent device that the user 200 was looking at and/or that the head-mounted device 110 was pointing at, the head-mounted device 110 can recognize a predefined gesture performed by the user 200, and/or determine that the user 200 has made and/or performed the predefined gesture. In some examples, the head-mounted device 110 can prompt the user to perform the predefined gesture by presenting a prompt on a display included in the head-mounted device 110. The head-mounted device 110 can recognize the predefined gesture and/or determine that the user has made and/or performed the predefined gesture based on images captured by the camera included in the head-mounted device 110. In some examples, the predefined gesture can include a grabbing motion toward the first electronic device (such as the smartphone 106) by the user's hand 202B and/or a throwing motion toward the second electronic device (such as the television 104) by the user's hand 202B.

Figure 2C:
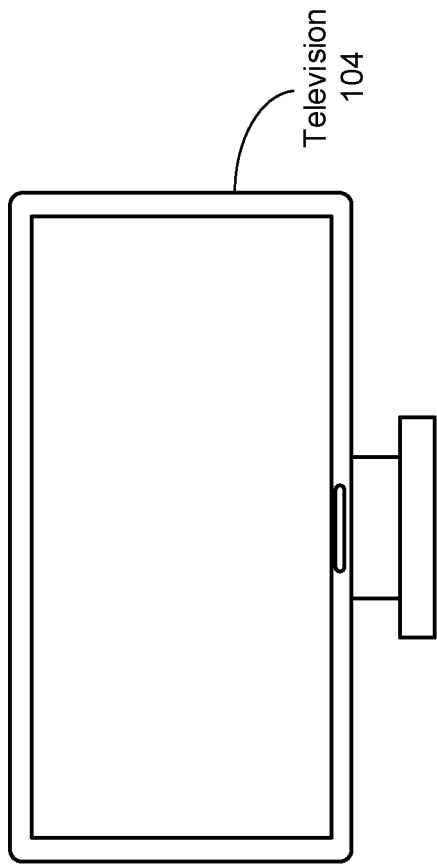
FIG. 2C is a perspective view of the user initiating a predefined gesture toward the first electronic device.
Figure 2C:
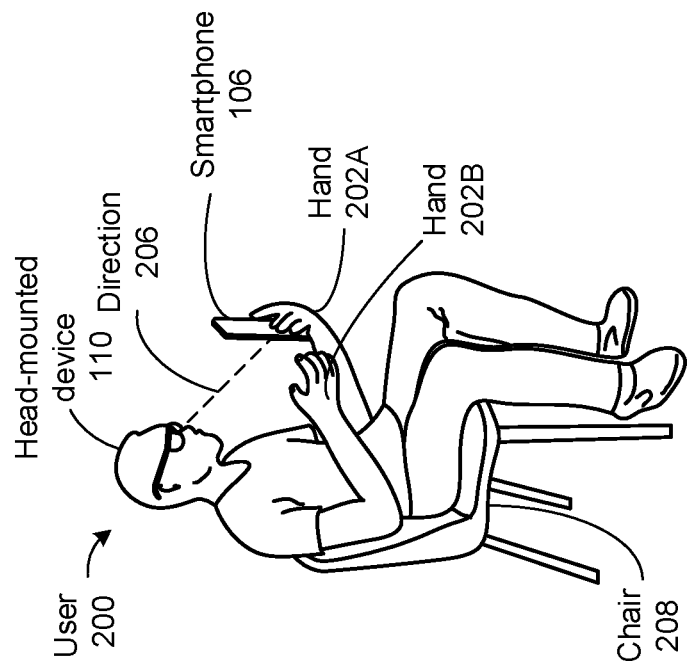

FIG. 2C is a perspective view of the user 200 initiating a predefined gesture toward the first electronic device. In this example, the initiation of the predefined gesture by the user 200 includes the user 200 making a grabbing motion toward the first electronic device (the smartphone 106) with the user's 200 right hand 202B while the smartphone 106 is presenting content. As described herein, a "grabbing motion," or, "grabbing gesture," can also be considered a lifting motion or lifting gesture. The predefined gesture, including the grabbing motion, does not include the user's 200 hand 202B contacting the first electronic device.

Figure 2D:
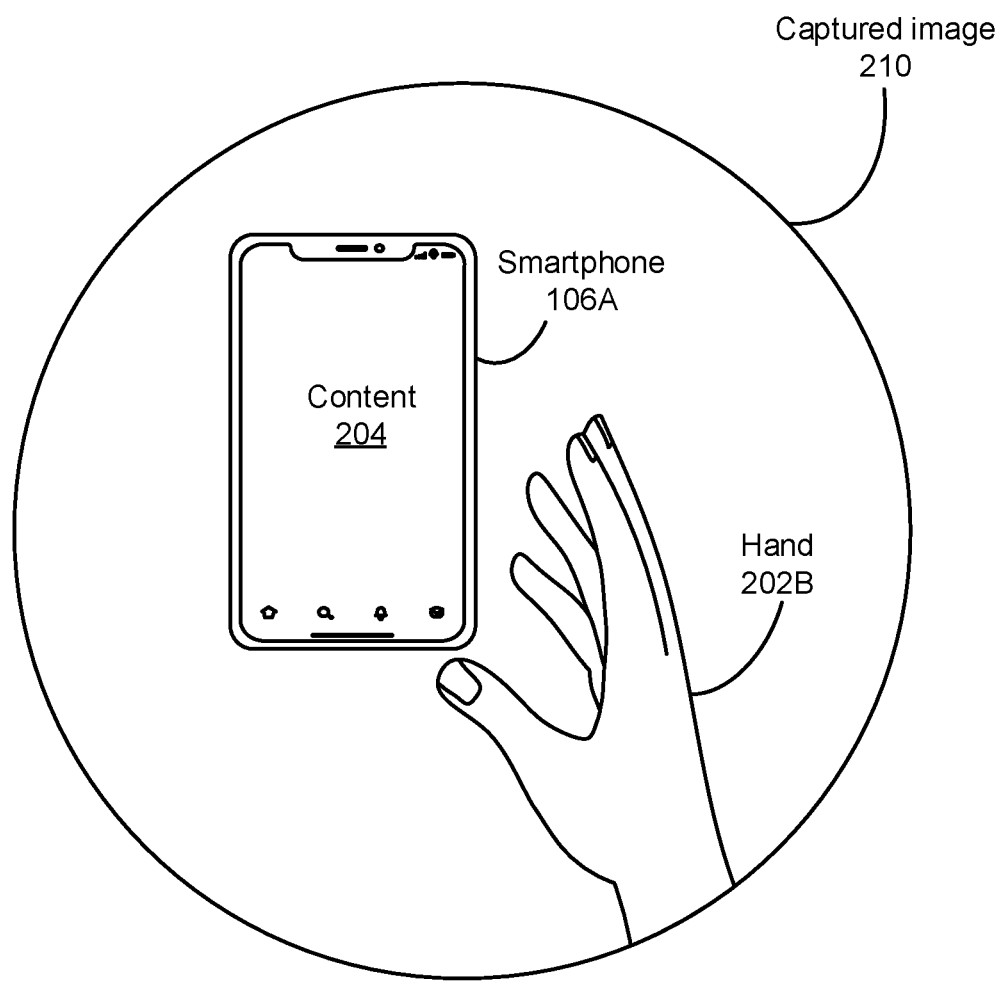
FIG. 2D shows an image, captured by the head-mounted device, of the user initiating the predefined gesture.

FIG. 2D shows an image 220, captured by the head-mounted device 110, of the user 200 initiating the predefined gesture. FIG. 2D shows the image 220 captured by the camera included in the head-mounted device 110 while the user 200 is making the grabbing gesture with the user's 200 right hand 202B toward the smartphone 106A as shown and described with respect to FIG. 2C. FIG. 2D shows a hand image 202C that corresponds to the hand 202B making a grabbing motion toward the image of the smartphone 106A that corresponds to the smartphone 106. The user 200 can continue the predefined gesture by making a throwing motion toward the second electronic device, which can be the television 104.

Figure 2E:
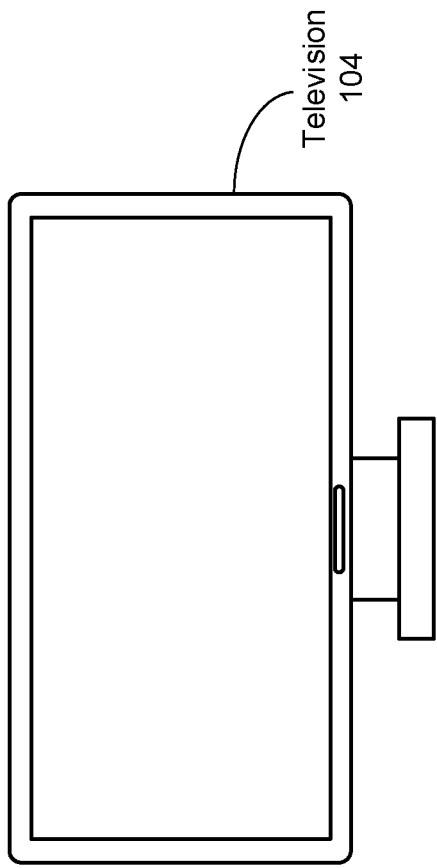
FIG. 2E is a perspective view of the user continuing the predefined gesture toward a second electronic device.
Figure 2E:
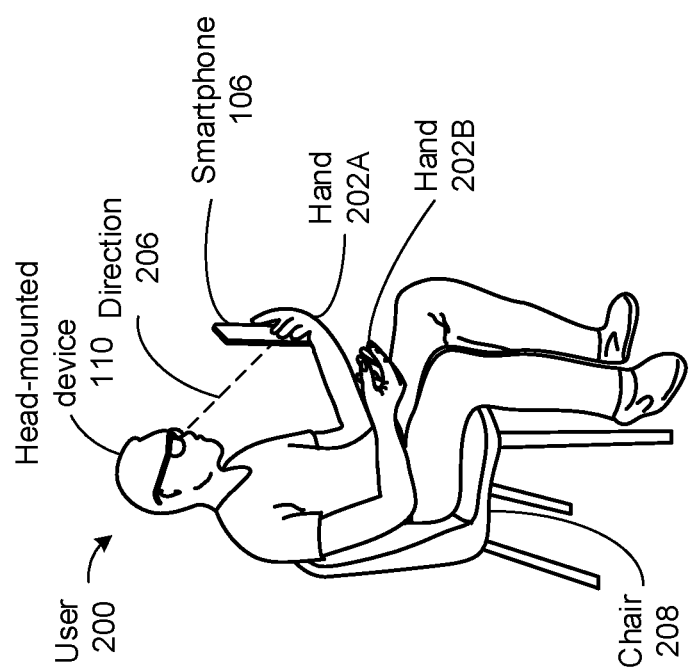

FIG. 2E is a perspective view of the user 200 continuing the predefined gesture toward a second electronic device. In this example, the continuation of the predefined gesture includes the user 200 making a throwing motion with the user's 200 hand 202B toward the second electronic device (the television 104). The predefined gesture, including the throwing motion, does not include the user's 200 hand 202B contacting the first electronic device. The head-mounted device 110 can recognize the throwing motion as completing the predefined gesture.

Figure 2F:
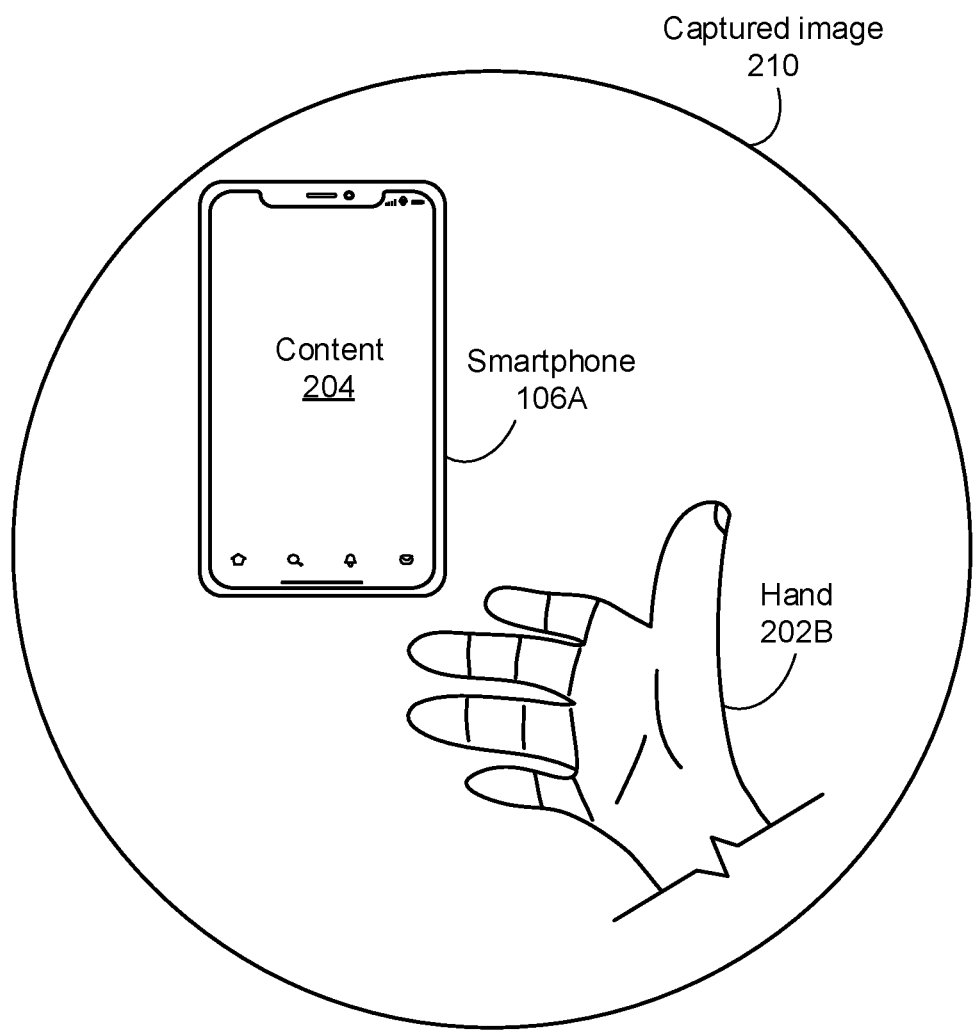
FIG. 2F shows an image, captured by the head-mounted device, of the user continuing the predefined gesture.

FIG. 2F shows an image 230, captured by the head-mounted device 110, of the user 200 continuing the predefined gesture. FIG. 2F shows the image 230 captured by the camera included in the head-mounted device 110 while the user 200 is making the throwing gesture with the user's 200 right hand 202B toward the television 104 (not shown in FIG. 2F) as shown and described with respect to FIG. 2E. FIG. 2F shows a hand image 202C that corresponds to the hand 202B making a throwing motion toward the location of the television 104, and/or away from the image of the smartphone 106A that corresponds to the smartphone 106. The throwing motion completes the predefined gesture.

The head-mounted device 110 can recognize the predefined gesture, which in some examples can include the grabbing and throwing motions described above, and/or determine that the user made and/or performed the predefined gesture. Based on recognizing the predefined gesture, and/or determining that the user 200 made and/or performed the predefined gesture, the head-mounted device 110 can cause the second electronic device, such as the television 104, to present and/or play the content 204 that the first electronic device, such as the smartphone 106, was presenting and/or playing when the head-mounted device recognized the predefined gesture and/or determined that the user 200 made and/or performed the predefined gesture. In some examples, the head-mounted device 110 can cause the second electronic device to present the content 204 by requesting the first electronic device to send an identifier of the content 204, such as a universal resource locator (URL) and timestamp of a video, to the head-mounted device 110, receiving the identifier of the content 204 from the first electronic device, and sending an instruction to the second electronic device to present the content 204. The instruction to the second electronic device can include the identifier. The instruction to the second electronic device can cause the second electronic device to respond to the instruction by presenting the content 204. In some examples, the head-mounted device 110 can cause the second electronic device to present the content 204 by requesting the first electronic device to send a file that includes the content 204 to either the head-mounted device 110 or to the second electronic device. After requesting the first electronic device to send the file, the head-mounted device 110 can send an instruction (which can include the file if the first electronic device sent the file to the head-mounted device 110) to the second electronic device to present the content 204, and the second electronic device can present the content 204.

Figure 2G:
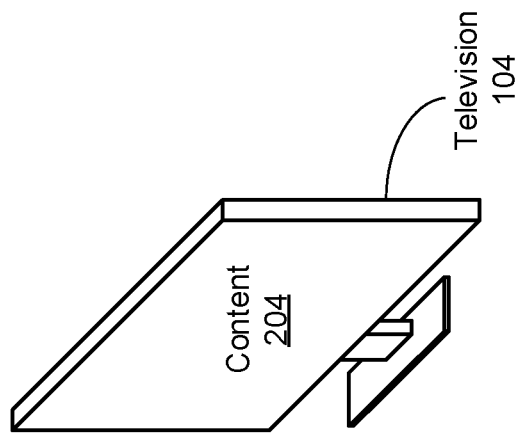
FIG. 2G is a perspective view showing the second electronic device presenting the content.
Figure 2G:
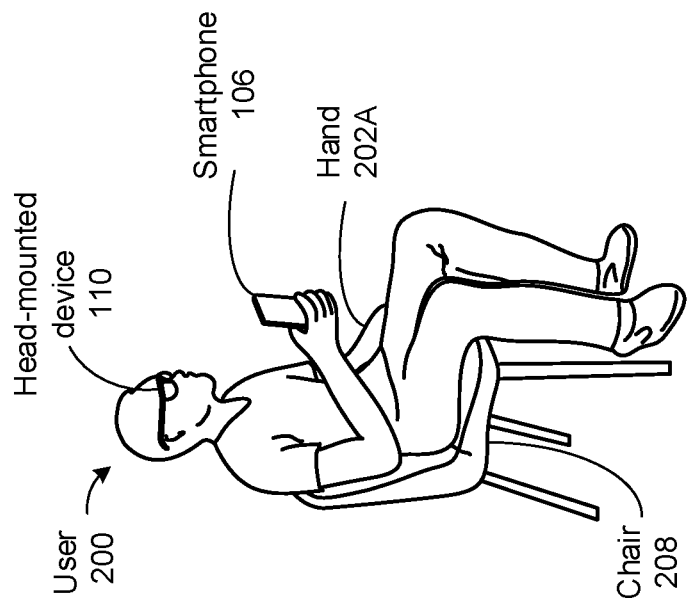

FIG. 2G is a perspective view showing the second electronic device presenting the content 204. The second electronic device, which in this example is the television 104, has responded to receiving the instruction from the head-mounted device 110 and/or the first electronic device to present the content 204 by presenting the content 204. The second electronic device can present the content by, for example, sending a content request (which can be included in a GET method) to a server addressed by the universal resource locator (URL), receiving a file from the server in response to sending the request, and presenting the content 204 based on the file received from the server.

Figure 3:
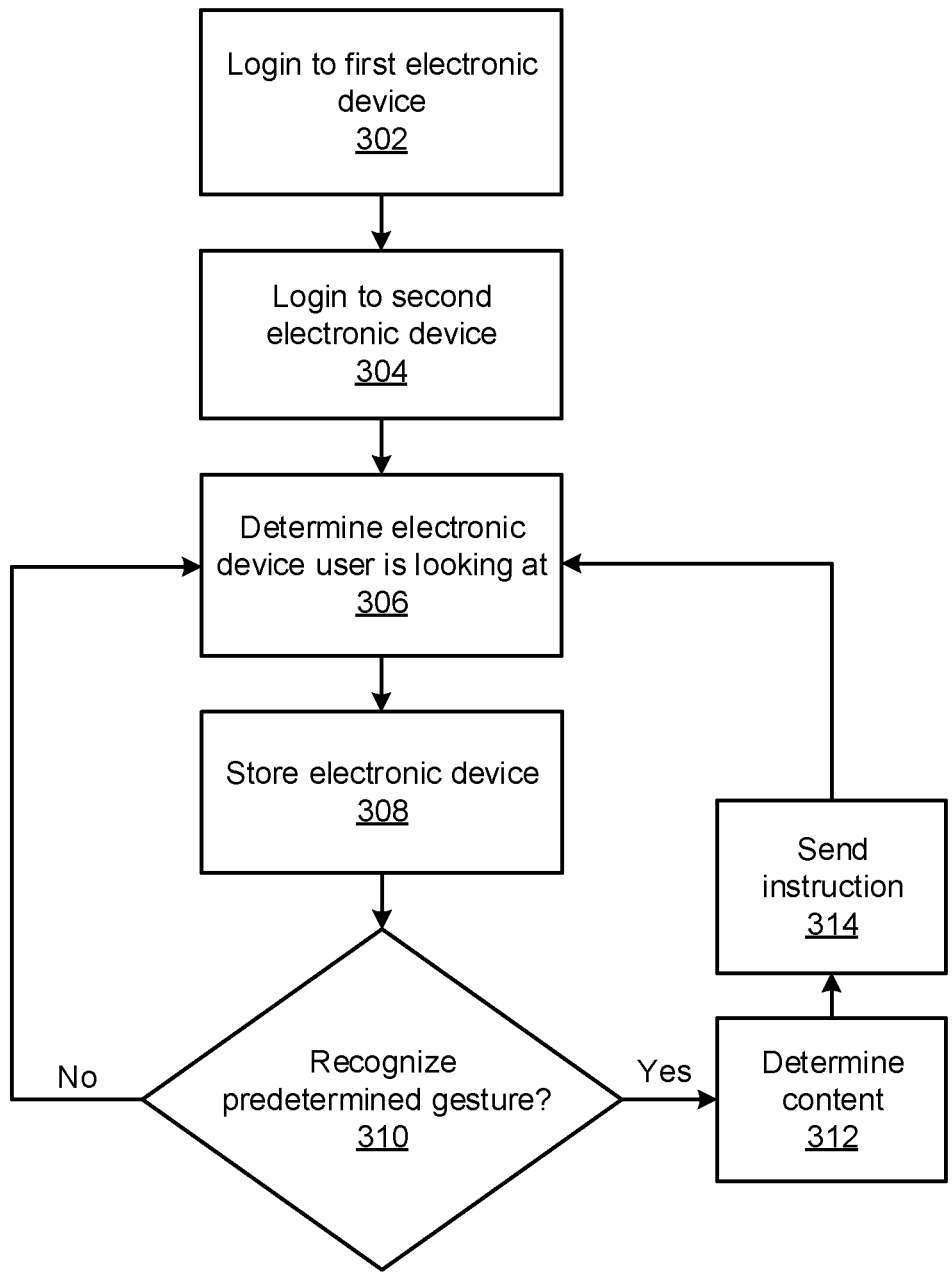
FIG. 3 is a flowchart showing processes performed by the head-mounted device.

FIG. 3 is a flowchart showing processes performed by the head-mounted device 110. In some examples, the user 200, and/or an account associated with the user 200, can log into the first electronic device (302) and into the second electronic device (304). The user 200 can log into the first electronic device (302) and the second electronic device (304) in examples in which the content 204 can be accessed only by authorized users. The user 200 can log into the first and second electronic devices in any order.

The head-mounted device 110 can determine which electronic device the user 200 is looking at (306). The head-mounted device 110 can determine which electronic device the user 200 is looking at (306) based, for example, on the direction 206 and/or orientation of the head-mounted device 110 and determined locations of the electronic devices in the wireless network 100, and/or based on recognizing an image of the first electronic device captured by the camera included in the head-mounted device 110. In some examples, the head-mounted device 110 can determine which electronic device the user 20 is looking at (306) based on gaze tracking, and/or determining a direction that the user's 200 eye(s) are pointing based on image(s) captured by one or more cameras included in the head-mounted device 110 that face the user's 200 eyes.

The head-mounted device 110 can store the most-recent electronic device that the user 200 looked at (308). The head-mounted device 110 can, for example, write over the previous most-recent electronic device that the user 200 looked at, so that only the most recently-viewed electronic device is stored.

After determining and/or storing a most recent electronic device that the user looked at, the head-mounted device 110 can determine whether a predefined gesture is recognized (310). In some examples, the predefined gesture can include a grabbing and throwing motion, in which the user 200 appears to grab the content 204 from the first electronic device and throw the content 204 to the second electronic device, which can be considered to be an instruction by the user 200 for the second electronic device to present and/or play the content being presented and/or played by the first electronic device. The head-mounted device 110 can recognize the gesture based on the captured images 220, 230 by performing any of various object recognition techniques including machine learning techniques and/or deep learning techniques.

If the head-mounted device 110 does not recognize a predefined gesture, then the head-mounted device 110 can continue determining the electronic device that the user 200 is looking at (306), so that when the head-mounted device 110 does recognize the predefined gesture, the most-recently viewed electronic device will have been updated.

If the head-mounted device 110 does recognize the predefined gesture, then the head-mounted device 110 can determine which content 204 the first electronic device and/or most-recently viewed electronic device is presenting and/or playing (312). The head-mounted device 110 can determine which content 204 the first electronic device is presenting and/or playing (312) by sending a content request to the first electronic device. In some examples, the first electronic device can respond to the content request by sending, to the head-mounted device 110, a file that was being presented and/or played and an identifier of a location within the file that was being presented and/or played. In some examples, the first electronic device can respond to the content request by sending, to the head-mounted device, an address, such as a universal resource locator (URL), of the content 204, as well as a location and/or time to indicate a location and/or time within the content 204 that the first computing device was presenting and/or playing.

After determining the content 312, the head-mounted device 110 can send an instruction (314) to the second electronic device to present and/or play the content 204 that was being presented and/or played by the first electronic device. In some examples, the instruction to the second electronic device can include the file received from the first electronic device that included the content 204. In some examples, the instruction can include an address, such as a URL, of the content 204. In some examples, the instruction can include a location and/or time so that the second electronic device can present the correct portion of the file or other representation, so that the second electronic device can seamlessly continue presenting the content 204. In some examples, the head-mounted device 110 can instruct the second electronic device to present and/or play the content 204 by instructing the first electronic device to transfer a file that includes the content to the second electronic device. In some examples, the first electronic device can respond to the instruction by pausing playing the content on the first electronic device. The second electronic device can respond to the instruction by presenting the content 204 based on the file or address and the location or time. After sending the instruction (314) to the second electronic device, the head-mounted device 110 can continue determining the electronic device that the user is looking at (306) so that the head-mounted device 110 can transfer content again the next time the head-mounted device 110 recognizes a predefined gesture.

Figure 4:
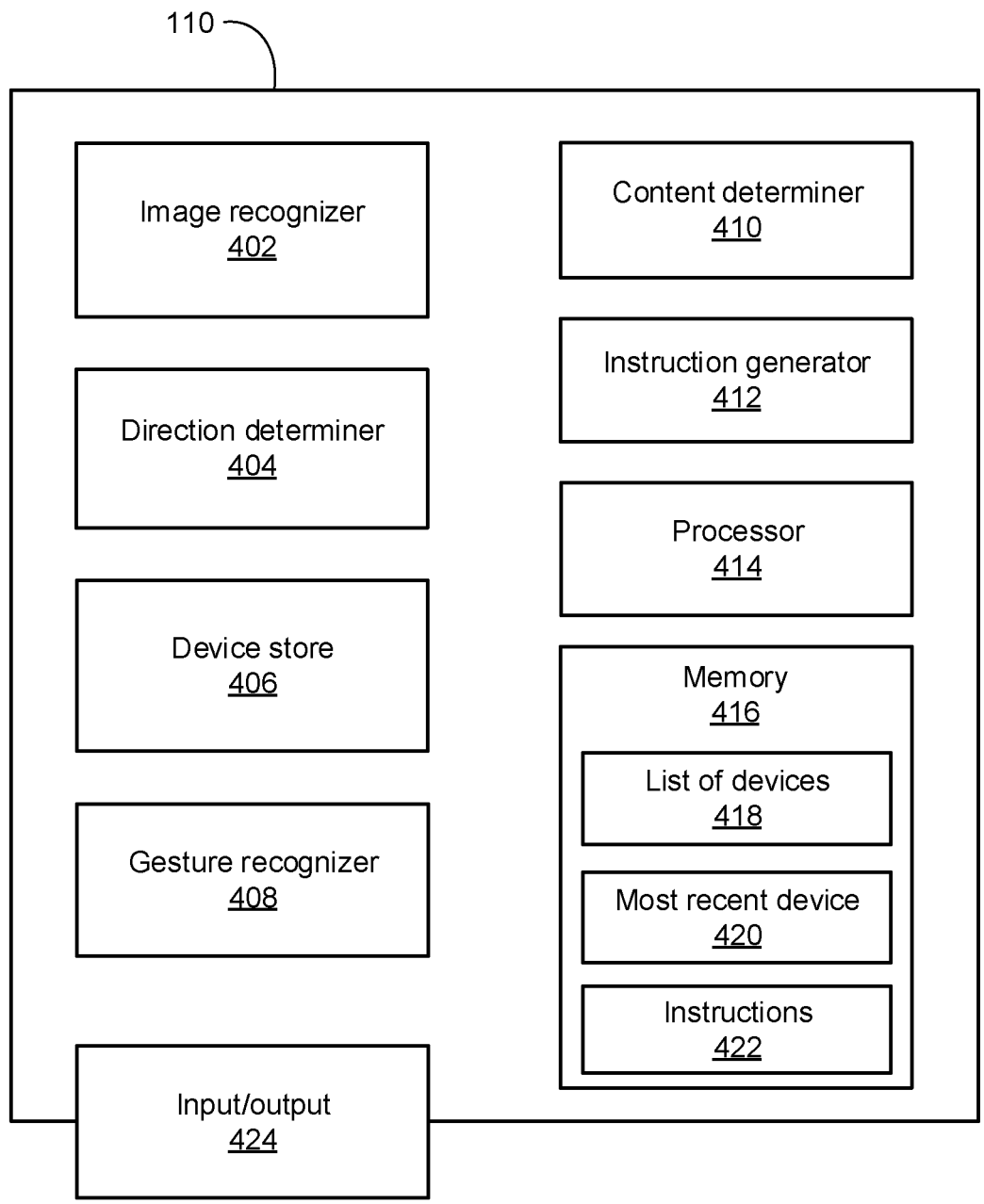
FIG. 4 is a block diagram of the head-mounted device.

FIG. 4 is a block diagram of the head-mounted device 110. The head-mounted device 110 can include an image recognizer 402. The image recognizer 402 can recognize objects in images 210, 220, 230 captured by the head-mounted device 110, such as electronic devices (including the type of electronic device, such as a smartphone 106, a tablet computing device 108, or a television 104), or a hand of a user 200. The image recognizer 402 can recognize the objects based on object recognition techniques such as machine learning techniques and/or deep learning techniques. In some examples, the head-mounted device 110 can determine which electronic device the user 200 is looking at based on recognizing the electronic device in the captured image 210.

The head-mounted device 110 can include a direction determiner 404. The direction determiner 404 can determine a direction 206 that the head-mounted device 110 is pointing and/or an orientation of the head-mounted device 110, such as based on an accelerometer included in the head-mounted device 110, based on which the direction that the user 200 is looking can be inferred. In some examples, the head-mounted device 110 can determine the electronic device that the user 200 is looking at based on the determined direction 206 and known and/or determined locations of the electronic devices.

The head-mounted device 110 can include a device store 406. The device store 406 can store the most-recently viewed electronic device. The most-recently stored electronic device can be determined by the image recognizer 402 and/or by the direction determiner 404.

The head-mounted device 110 can include a gesture recognizer 408. The gesture recognizer 408 can recognize gestures, such as hand gestures performed by a user 200. The gesture recognizer 408 can recognize the gestures based on image recognition techniques such as machine learning techniques and/or deep learning techniques. The gesture recognizer 408 can include and/or store a gesture library 409. The gesture library 409 can include and/or store one or more predefined gestures. The gesture recognizer 408 can determine whether a gesture and/or motion matches one or more predefined gestures stored in the gesture library 409. The gesture recognizer 408 can determine whether a gesture and/or motion matches one or more predefined gestures stored in the gesture library 409 by, for example, calling a gesture recognition function and/or application programming interface (API) that compares a probability that the gesture captured by the camera matches a predefined gesture stored in the gesture library 409 to a threshold. If the probability meets or exceeds the threshold, then the gesture recognizer can determine that the gesture and/or motion does match the predefined gesture stored in the gesture library 409. If the gesture and/or motion does match the predefined gesture stored in the gesture library 409, the gesture recognizer 408 can prompt the head-mounted device 110 to perform a predefined action, such as instructing a second electronic device to present and/or play content in response to the gesture recognizer 408 recognizing a predefined grab-and-throw gesture.

The head-mounted device 110 can include a content determiner 410. The content determiner 410 can determine the content 204 that the first electronic device is presenting and/or playing. The content determiner 410 can determine the content 204 by, for example, sending a content request to the first electronic device and receiving, from the first electronic device in response to the content request, a content message. The content message can include a file from which the content was generated and an indicator of a location or time within the file that the first electronic device was presenting and/or playing the content, or an address such as a URL of the content and an indicator of the location or time to maintain the same content 204 on the second electronic device.

The head-mounted device 110 can include an instruction generator 412. The instruction generator 412 can generate and/or send an instruction to the second electronic device for the second electronic device to present and/or play the content 204 that the first electronic device had been presenting and/or playing. The instruction generator 412 can send, to the second electronic device, a content presentation message prompting the second electronic device to present the content 204. The content presentation message can include the file and/or an address of the content 204, and/or a location or time within the file to present the content 204. The second electronic device can present and/or play the content 204 in response to receiving the content presentation message and/or instruction from the instruction generator 412.

The head-mounted device 110 can include at least one processor 414. The at least one processor 414 can execute instructions, such as instructions stored in at least one memory device 416, to cause the head-mounted device 110 to perform any combination of methods, functions, and/or techniques described herein.

The head-mounted device 110 can include at least one memory device 416. The at least one memory device 616 can include a non-transitory computer-readable storage medium. The memory 416 can store a list of devices 418 (such as the smartphone 106, tablet 108, and television 104 in the example of FIG. 1) in the wireless network 100. The memory 416 can store a most recent device 420 that the user 200 looked at and/or that the head-mounted device 110 looked at. The at least one memory device 416 can store data and instructions 422 thereon that, when executed by at least one processor, such as the processor 414, are configured to cause a computing system such as the head-mounted device 110 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the head-mounted device 110 can be configured to perform, alone, or in combination with the other electronic devices, any combination of methods, functions, and/or techniques described herein.

The head-mounted device 110 can include at least one input/output node 424. The at least one input/output node 424 can receive and/or send data, and/or can receive input and provide output from and to a user. The input and output functions may be combined into a single node, or may be divided into separate input and output nodes. The input/output node 224 can include, for example, a camera, a speaker, a microphone, one or more buttons, a motion detector and/or accelerometer, a thermometer, a light sensor, and/or one or more wired or wireless interfaces for communicating with other computing devices.

FIG. 5A is a front perspective view of an implementation of the head-mounted device 110 as augmented-reality (AR) glasses 500. The AR glasses 500 can include at least a lens frame 505, a first lens element 520, a second lens element 525, a first side-arm 530, a second side-arm 535, an image capture device (e.g., a camera 540), and a display 545.

The lens frame 505, first side-arm 530 and second side-arm 535 can be configured to support and contain components, circuitry, and interconnects. For example, the first side-arm can have a portion 532 configured to support a battery (e.g., rechargeable battery). The size of the portion 532 can limit size of the battery and its corresponding available energy between charging. The techniques described herein can be advantageous because they can help to extend the life of the battery. In other words, the techniques disclosed herein can help to extend a useable period of the AR device between charges. The lens frame 505, the first side-arm 530 and/or the second side-arm 535 can further support and enclose a processor (not shown), memory (not shown), and an audio interface (not shown). The audio interface can include a speaker or speakers (cone, bone-conduction, etc.) to convey audio data to a user. Additionally, the audio interface can include one or more microphones to capture sounds, such as voice commands from a user.

The AR glasses 500 can include a display 545. The display 545 can include a projector to project images and a prism to route the images to a user's eye. Additionally, light from a field-of-view 550 can pass through the prism to an eye of a user, thereby making the displayed images appear overlaid onto the environment observed by the user. In other words, the display and glasses can function as a heads-up display (HUD) for the user. The prism can be separate from the first lens element 520 or the second lens element 525 as shown in FIG. 5A; however, in in another possible implementation it can be less conspicuous.

The prism can be incorporated in the first lens element 520 and/or the second lens element 525. For example, a coating on a surface of the first lens element 520 and/or the second lens element 525 can partially reflect a projected image while also allowing light from a field of view to pass through to the user.

FIG. 5B is a rear perspective view of an implementation of the head-mounted device 110 as augmented-reality glasses. The second lens element 525 can be used as a prism for the HUD. A projector 565 integrated in a side-arm 560 of the AR glasses can project images in an area 570 of the second lens element 525. The projected images can be reflected from the area to an eye of the user. The present disclosure is not limited to projector/prism implementations and recognizes that other variations used in heads up displays can exist. For example, the lens elements can be transparent display elements that can be electronically addressed to pass or block light (e.g., liquid crystal display) or to electronically illuminate (e.g., organic LED display). In these implementations, a projector may not be necessary.

Returning for FIG. 5A, the AR glasses 500 can also include a camera 540. The camera 540 can be aligned to capture images of the field-of-view 550. In other words, the camera 540 can capture images that correspond to what a user wearing the AR glasses 500 is viewing. The camera 540 can be configured to capture images (e.g., still, video) at various resolutions and at different frame rates. While a single camera 540 is illustrated in FIG. 5A, more cameras can be included in the AR glasses 500. For implementations including more than one camera, the disclosed techniques can be used to wake and sleep each of the cameras.

The AR glasses can be used to interpret certain gestures (e.g., by a user's 200 hand or hands) as user input. For example, the AR glasses 500 can capture hand gestures by analyzing image data from the camera 540, and initiate tasks that are defined as corresponding to certain predefined gestures. Further, a speaker and a microphone in the AR glasses can be used as input/output components. For example, the microphone can detect speech that can be used to supplement and/or modify the intent associated with the hand gesture. The speaker can be configured to output an audible signal that can be heard by the user. The audible signal can be associated with the task associated with the task (or tasks) that are responsive to the hand gesture. For example, the audible signal can be a beep indicating a task has been completed.

FIG. 6 is a perspective view of another implementation of the head-mounted device 110. As shown in FIG. 6, the head-mounted device 110 can be an AR ear-mounted sound device (i.e., earbud). The AR earbud 600 can include an earpiece that is configured for mounting inside an ear of a user. The AR earbud 600 can include a speaker that is configured to present audio to a user. The AR earbud can also include a camera. The camera may be aligned so that when the AR earbud is worn in the ear of the user 200, the camera images the field of view 620 of the user 200. Accordingly, the AR earbud may analyze images captured by the camera and transmit AR audio to a user based on this analysis.

Examples herein refer to augmented reality (AR). As used herein, AR refers to a user experience in which a computing device facilitates a sensory perception that includes at least one virtual aspect and at least one aspect of reality. AR can be provided by any of multiple types of computing devices, including, but not limited to, a wearable device. As used herein, an AR headset (which can be an example of a head-mounted device) refers to any computing device that facilitates AR. An AR headset can include, but is not limited to, smart eyewear or smart glasses or AR glasses, another wearable AR device, a tablet, a phone, or a laptop computer. In some types of AR, the user can perceive the aspect of reality directly with his or her senses without intermediation by the computing device. For example, some AR headsets are designed to beam an image (e.g., the virtual aspect to be perceived) to the user's retina while also allowing the eye to register other light that was not generated by the AR headset. In other types of AR, a computing device can improve, complement, alter, and/or enable the user's impression of reality (e.g., the real aspect to be perceived) in one or more ways. In some implementations, AR is perceived on a screen of a computing device's display device. For example, some AR headsets are designed with camera feedthrough to present a camera image of the user's surrounding environment on a display device positioned in front of the user's eye. The display device may be an in-lens micro display, a display projected on a lens surface, a display projected on a plane of a lens-less frame, or other type of display.

Figure 7:
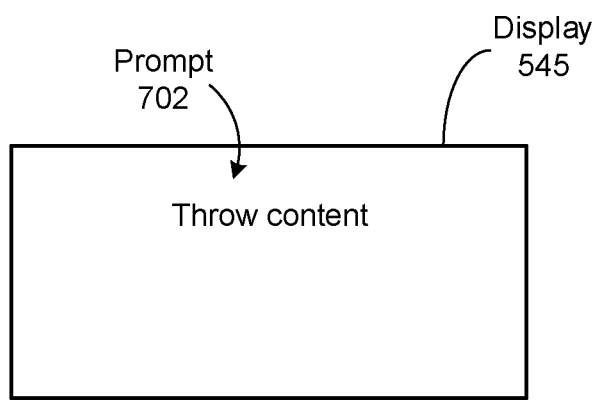
FIG. 7 shows a prompt presented by a display included in the head-mounted device.

FIG. 7 shows a prompt 702 presented by a display 545 included in the head-mounted device 110. The display 545 can present the prompt 702, which can be text, prompting and/or teaching the user 200 of a predefined gesture, such as a throwing and/or grabbing and throwing gesture, to transfer content 204 from the first electronic device to the second electronic device.

Figure 8:
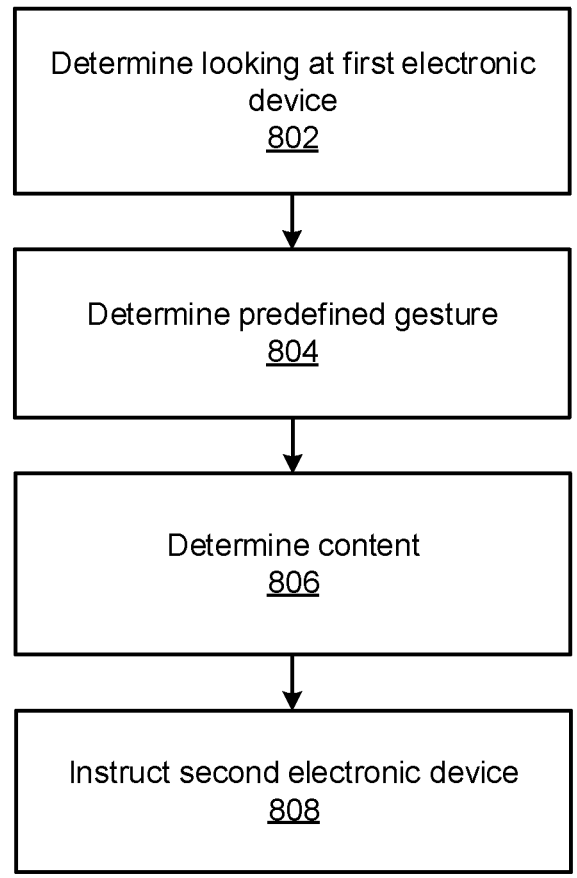
FIG. 8 is a flowchart of a method performed by the head-mounted device.

FIG. 8 is a flowchart of a method performed by the head-mounted device 110. The method can include determining, by the head-mounted device 110, that a user 200 is looking at a first electronic device (802). The first electronic device can include a smartphone or a tablet, as non-limiting examples. The method can include determining that the user 200 made a predefined gesture (804). The method can include determining content 204 that was presented by the first electronic device when the user 200 made the predefined gesture (806). The method can include instructing a second electronic to present the content 204 that was presented by the first electronic device when the user 200 made the predefined gesture (808). The second electronic device can include a television 104, as a non-limiting example.

According to some examples, the determining that the user 200 is looking at the first electronic device (802) can include determining that the user 200 is looking at the first electronic device based on an orientation of the head-mounted device 110.

According to some examples, the determining that the user 200 is looking at the first electronic device (802) can include determining that the user 200 is looking at the first electronic device based on an image of the first electronic device being captured by a camera 540 included in the head-mounted device 110.

According to some examples, the determining that the user 200 is looking at the first electronic device (802) can include selecting the first electronic device from a list of devices in wireless communication with the head-mounted device 110.

According to some examples, the determining that the user 200 made the predefined gesture (804) can include determining that the user made the predefined gesture after looking at the first electronic device.

According to some examples, the method can further include storing an indicator that the first electronic device was a most-recently looked at electronic device.

According to some examples, the predefined gesture can include a throwing motion.

According to some examples, the predefined gesture can include a movement of a hand 202B of the user 200, the hand 202B of the user not contacting the first electronic device.

According to some examples, the head-mounted device 110 can be wirelessly coupled to the first electronic device, and the head-mounted device 110 can be wirelessly coupled to the second electronic device.

According to some examples, the head-mounted device 110, the first electronic device, and the second electronic device can be included in a wireless local area network.

According to some examples, an account associated with the user can be logged into both the first electronic device and the second electronic device.

According to some examples, the first electronic device can include a smartphone 106.

According to some examples, the second electronic device can include a television 104.

According to some examples, the method can further include instructing the first electronic device to transfer a file to the second electronic device.

According to some examples, the method can further include instructing the first electronic device to pause the content 204.

According to some examples, the method can further include presenting, to the user 200, a prompt 702 to present the content 204 on the second electronic device.

Figure 9:
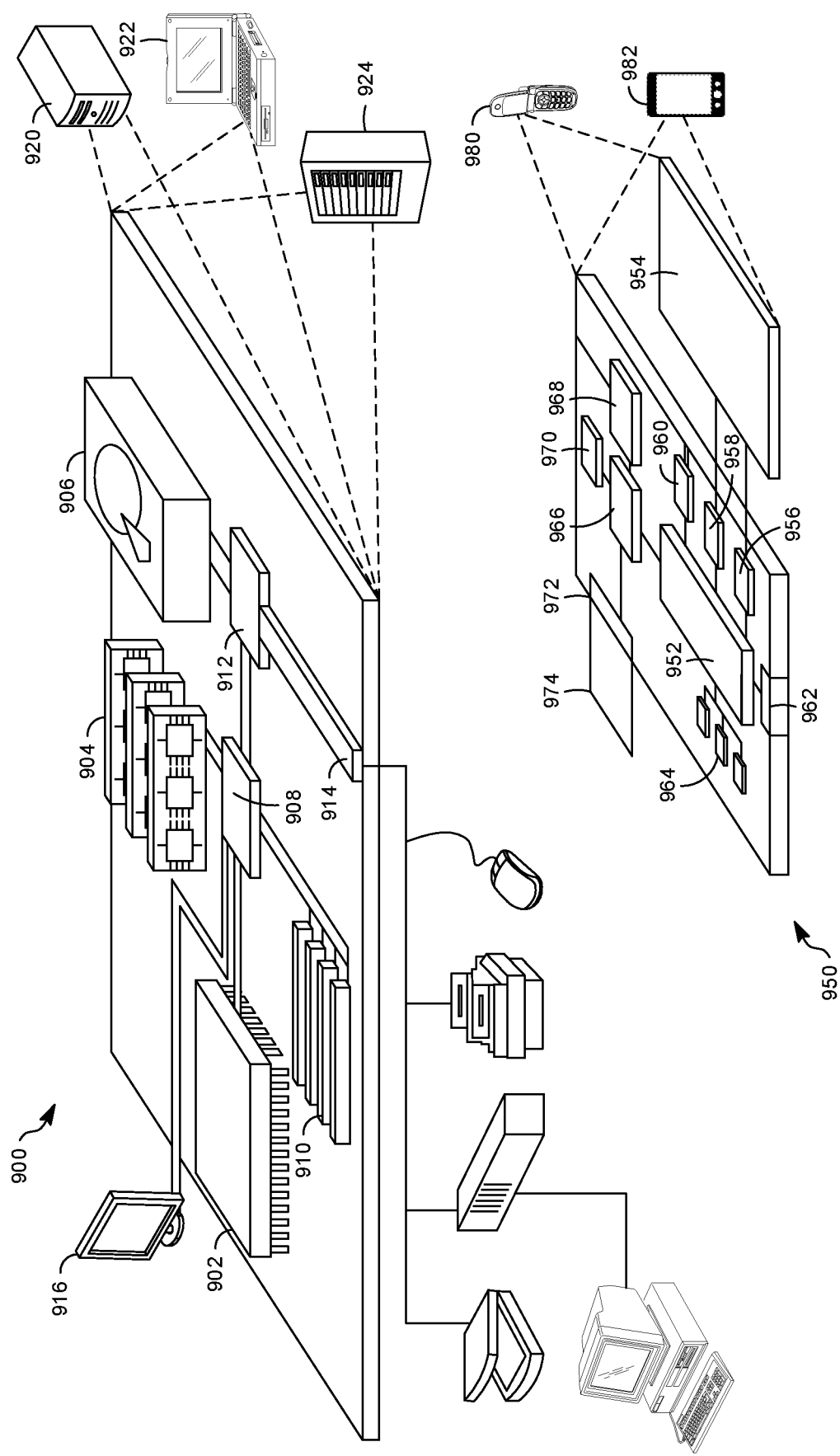
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, tablets, workstations, personal digital assistants, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
determining, by a head-mounted device, that a user is looking at a first electronic device and that the user made a predefined gesture; and transferring, by the head-mounted device, content from the first electronic device to a second electronic device, the transferring including:
  determining the content that was presented by the first electronic device when the user made the predefined gesture by sending a content request to the first electronic device and receiving, from the first electronic device in response to the content request, a content message, the content message indicating the content; and
  instructing the second electronic device to present the content that was presented by the first electronic device when the user made the predefined gesture, the instructing including sending an indicator of the content to the second electronic device.

2. The method of claim 1, wherein the determining that the user is looking at the first electronic device comprises determining that the user is looking at the first electronic device based on an orientation of the head-mounted device.

3. The method of claim 1, wherein the determining that the user is looking at the first electronic device comprises determining that the user is looking at the first electronic device based on an image of the first electronic device being captured by a camera included in the head-mounted device.

4. The method of claim 1, wherein the determining that the user made the predefined gesture comprises determining that the user made the predefined gesture after looking at the first electronic device.

5. The method of claim 1, further comprising storing an indicator that the first electronic device was a most-recently looked at electronic device.

6. The method of claim 1, wherein the predefined gesture includes a throwing motion.

7. The method of claim 1, wherein the predefined gesture includes a movement of a hand of the user, the hand of the user not contacting the first electronic device.

8. The method of claim 1, wherein:
  the head-mounted device is wirelessly coupled to the first electronic device; and
  the head-mounted device is wirelessly coupled to the second electronic device.

9. The method of claim 1, wherein the head-mounted device, the first electronic device, and the second electronic device are included in a wireless local area network.

10. The method of claim 1, wherein an account associated with the user is logged into both the first electronic device and the second electronic device.

11. The method of claim 1, wherein the first electronic device includes a smartphone.

12. The method of claim 1, wherein the second electronic device includes a television.

13. The method of claim 1, further comprising instructing the first electronic device to transfer a file to the second electronic device.

14. The method of claim 1, further comprising instructing the first electronic device to pause the content.

15. The method of claim 1, further comprising presenting, to the user, a prompt to present the content on the second electronic device.

16. A non-transitory computer-readable storage medium comprising instructions stored thereon that, when executed by at least one processor, are configured to cause a head-mounted device to:
  determine, by the head-mounted device, that a user is looking at a first electronic device and that the user made a predefined gesture;
  store an indicator that the first electronic device was a most-recently looked at electronic device; and
  transfer, by the head-mounted device based on the user making the predefined gesture and the first electronic device being the most-recently looked at electronic device, content from the first electronic device to a second electronic device, the transferring including:
    determining the content that was presented by the first electronic device when the user made the predefined gesture by sending a content request to the first electronic device and receiving, from the first electronic device in response to the content request, a content message, the content message indicating the content; and
    instructing the second electronic device to present the content that was presented by the first electronic device when the user made the predefined gesture.

17. The non-transitory computer-readable storage medium of claim 16, wherein the instructions are further configured to cause the head-mounted device to store an indicator that the first electronic device was a most-recently looked at electronic device.

18. The non-transitory computer-readable storage medium of claim 16, wherein the predefined gesture includes a movement of a hand of the user, the hand of the user not contacting the first electronic device.

19. A head-mounted device comprising:
  at least one processor; and
  a non-transitory computer-readable storage medium comprising instructions stored thereon that, when executed by at least one processor, are configured to cause the head-mounted device to:
    determine that a user is looking at a first electronic device and that the user made a predefined gesture; and
    transfer content from the first electronic device to a second electronic device, the transferring including:
      determining the content that was presented by the first electronic device when the user made the predefined gesture by sending a content request to the first electronic device and receiving, from the first electronic device in response to the content request, a content message, the content message indicating the content;
      instructing the first electronic device to pause the content; and
      instructing the second electronic device to present the content that was presented by the first electronic device when the user made the predefined gesture.

20. A head-mounted device comprising:
  at least one processor; and
  a non-transitory computer-readable storage medium comprising instructions stored thereon that, when executed by at least one processor, are configured to cause the head-mounted device to:
    present a prompt teaching a user a predefined gesture;
    determine that a user is looking at a first electronic device and that the user made the predefined gesture; and
    transfer content from the first electronic device to a second electronic device, the transferring including:
      determining the content that was presented by the first electronic device when the user made the predefined gesture by sending a content request to the first electronic device and receiving, from the first electronic device in response to the content request, a content message, the content message indicating the content; and instructing the second electronic device to present the content that was presented by the first electronic device when the user made the predefined gesture.

21. A non-transitory computer-readable storage medium comprising instructions stored thereon that, when executed by at least one processor, are configured to cause a head-mounted device to:

determine, by the head-mounted device, that a user is looking at a first electronic device and that the user made a predefined gesture; and transfer, by the head-mounted device, video content from the first electronic device to a second electronic device, the transferring including:

determining the video content that was presented by the first electronic device when the user made the predefined gesture by sending a video content request to the first electronic device and receiving, from the first electronic device in response to the video content request, a video content message, the video content message indicating the video content; and instructing the second electronic device to present the video content that was presented by the first electronic device when the user made the predefined gesture.

* * * * *